(Model.)
E. H. FUNK.
ROTARY CHURN.
No. 305,444. Patented Sept. 23, 1884.
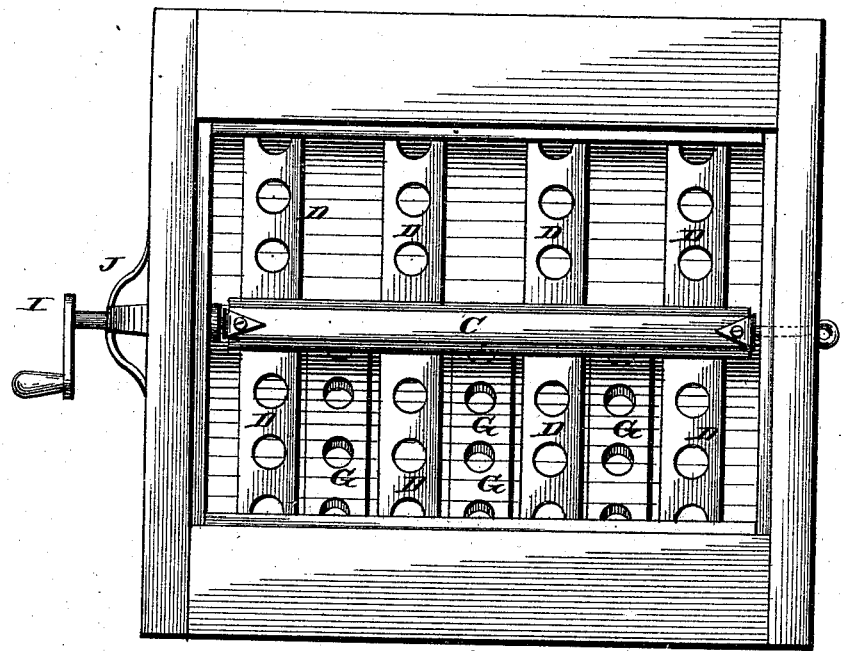
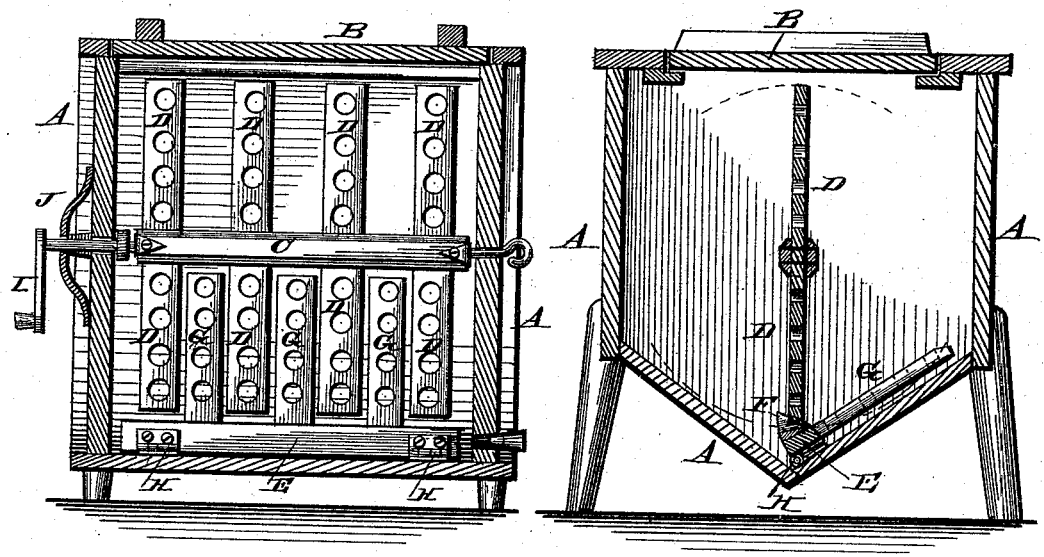
WITNESSES
Phil C. Dieterich
A. E. Powell
INVENTOR
Elliott H. Funk

UNITED STATES PATENT OFFICE.

ELLIOTT H. FUNK, OF STURGIS, MICHIGAN.

ROTARY CHURN.

SPECIFICATION forming part of Letters Patent No. 305,444, dated September 23, 1884.

Application filed January 26, 1884. (Model.)

*To all whom it may concern:*

Be it known that I, ELLIOTT H. FUNK, of Sturgis, in the county of St. Joseph and State of Michigan, have invented certain new and useful Improvements in Rotary Churns; and I do hereby declare the following to be a full, clear, and exact description thereof, reference being had to the accompanying drawings, and to the letters of reference marked thereon, which form part of this specification, in which—

Figure 1 represents a top view of a churn, with breaker-boards lying half-way down. Fig. 2 is a vertical sectional view showing the break-boards standing up, ready to churn. Fig. 3 is a transverse sectional view showing the break-board lying flat down, ready to gather the butter.

A A A represent the body of the churn with a cone-shaped bottom. B is a cover. C is a shaft that has holes mortised through it. D D D are perforated beaters, each made in one solid piece and run through a mortise in shaft C. E is a hinged bar. F F are stop-lugs attached to hinged bar E, to hold it in an upright position by their bearing on the body of the churn A. G G G are perforated break-boards, mortised into hinged bar E. H H are hinges to operate the breaker-boards G G G. I is a crank to turn the beater-boards D D D. J is a support to crank-shaft to keep it in position.

The operation is as follows: When the crank I is turned to the right, the current caused by the beater-boards D D D catches the breaker-boards G G G and sets them in a perpendicular position. They then act as breakers, and the motion of the beaters D D D causes the cream to be forced through the breaker-boards G G G, in converging torrents, breaking the globules or sacks that contain the butter effectually in a short time. When the globules are broken and ready to gather, the crank I is turned to the left, and the beaters turn the current of the cream in the opposite direction, which throws down the breaker-boards, so that they are out of the way, and the friction is reduced, so that the butter can be gathered; or, in other words, it turns to the right to churn and to the left to gather the butter.

Having explained my invention to the best of my knowledge, what I claim is—

1. The combination, with the rotary shaft C, carrying beaters D D D, of the hinged bar E, provided with breaker-boards G G G, substantially as described.

2. The combination, with the rotary shaft C, carrying beaters D D D, of the hinged bar E, provided with breaker-boards G G G and stop-lugs F F, substantially as described.

In testimony that I claim the foregoing as my own I affix my signature in presence of two witnesses.

ELLIOTT H. FUNK.

Witnesses:
    P. C. DIETRICH,
    A. E. DOWELL.